Patented Aug. 23, 1932

1,873,948

UNITED STATES PATENT OFFICE

ERWIN KRAMER, OF COLOGNE-DEUTZ, BERNHARD BOLLWEG, OF LEVERKUSEN-ON-THE-RHINE, AND LUDWIG ZEH, OF WIESDORF-ON-THE-RHINE, GERMANY, ASSIGNORS TO GENERAL ANILINE WORKS, INC., OF NEW YORK, N. Y., A CORPORATION OF DELAWARE

PROCESS OF DYEING WITH SUBSTITUTED SULPHUR DYESTUFFS

No Drawing. Original application filed June 21, 1928, Serial No. 287,342, and in Germany July 14, 1927. Divided and this application filed April 28, 1930. Serial No. 448,162.

The present invention relates to a process of dyeing vegetable fibers with substituted sulphur dyestuffs and to the dyed fibers obtained thereby.

In the process hereafter described we use as starting materials the sulphur dyestuffs which are obtainable by reacting upon binaphthylenedioxide with a sulphurating agent at a temperature between about 170 and 300° C. which process is more fully described in U. S. Patent 1,758,324.

We have found that new valuable substituted dyestuffs can be prepared on vegetable fibers by dyeing in the usual manner the fibers with one of the above mentioned sulphur dyestuffs, rinsing the goods and treating them with a solution of an alkylating, aralkylating or arylating agent (for instance, with a solution of dimethylbenzyl-phenyl-ammonium chloride) at an elevated temperature, favorably in a boiling bath and preferably in the presence of an agent capable of exerting a reducing action and of a small amount of alkali, said process being described in U. S. Patent No. 688,999.

By working at a lower temperature or without the addition of a reducing agent, the development is retarded and it may, according to the agents used in the subsequent treatment, entirely fail to take place. The dyeings obtained display very satisfactory fastness to boiling and kier boiling. Our new dyestuffs yield clear red shades of a quality which was not obtainable hitherto by means of sulphur dyestuffs.

The following example illustrates the invention:—

*Example.*—The dyeing obtained on cotton with the sulphur dyestuff produced from binaphthylene dioxide by heating the same with sulphur monochloride at 80–120° C. and afterwards for several hours at 220–240° C. according to Example 2 of U. S. Patent 1,758,324 is, after squeezing and rinsing, drawn for 10–20 minutes through a boiling bath, containing 4 ccs. of caustic soda lye (40° Bé.), 1.5 grams of sodium hydrosulphite and 10 grams of dimethylbenzylphenyl-ammonium chloride per liter. In this manner is obtained a clear red dyeing, very fast to boiling and kier boiling.

By employing in this example trimethylphenylammonium chloride as the developer, a beautiful red is likewise obtained. Epichlorhydrin and monochlorhydrin yield duller shades. With the dyestuff obtainable by heating binaphthylene dioxide with sulphur at 240–280° C. for several hours and being produced in accordance with Example 1 of U. S. Patent 1,758,324 and dimethylbenzylphenylammonium chloride, a clear reddish orange results, and with trimethylphenylammonium chloride a reddish yellow brown.

This application is a division of our application Ser. No. 287, 342, filed June 21, 1928.

We claim:

1. The process which comprises dyeing vegetable fibers with a sulphur dyestuff obtainable by reacting upon binaphthylene dioxide with a sulphurating agent at a temperature between 170 and 300° C. rinsing and boiling the fibers in an aqueous bath containing a small amount of alkali, a reducing agent and a compound of the group consisting of the alkylating, aralkylating and arylating agents.

2. The process which comprises dyeing vegetable fibers with a sulphur dyestuff obtainable by reacting upon binaphthylene dioxide with a sulphurating agent at a temperature between 170 and 300° C., rinsing and boiling the fibers in an aqueous bath containing an alkylating agent, a small amount of alkali and a reducing agent.

3. The process which comprises dyeing vegetable fibers with a sulphur dyestuff obtainable by reacting upon binaphthylene dioxide with a sulphurating agent at a temperature between 179 and 300° C., and drawing the fibers for 10–20 minutes through a boiling bath containing trimethylphenyl ammonium chloride, a small amount of hydrosulphite and a small amount of caustic soda.

4. Fibers dyed with a sulphur dyestuff, obtainable by reacting upon binaphthylene dioxide with a sulphurating agent at a temperature between 170 and 300° C. and after treating on the fiber with an alkylating, aralkylating or arylating agent.

5. Fibers dyed with a sulphur dyestuff, obtainable by reacting upon binaphthylene dioxide with a sulphurating agent at a temperature between 170 and 300° C. and after treating on the fiber with trimethylphenyl ammonium chloride.

ERWIN KRAMER.
BERNHARD BOLLWEG.
LUDWIG ZEH.